June 10, 1952 V. A. TYLER 2,600,032
LIQUID FUEL METER
Filed May 26, 1948 7 Sheets-Sheet 1

Inventor
Vern A. Tyler

By Clarence A. O'Brien
and Harvey B. Jacobson
Attorneys

June 10, 1952  V. A. TYLER  2,600,032
LIQUID FUEL METER
Filed May 26, 1948  7 Sheets-Sheet 2

Inventor
Vern A. Tyler
By Clarence A. O'Brien
and Harvey B. Jacobson
Attorneys

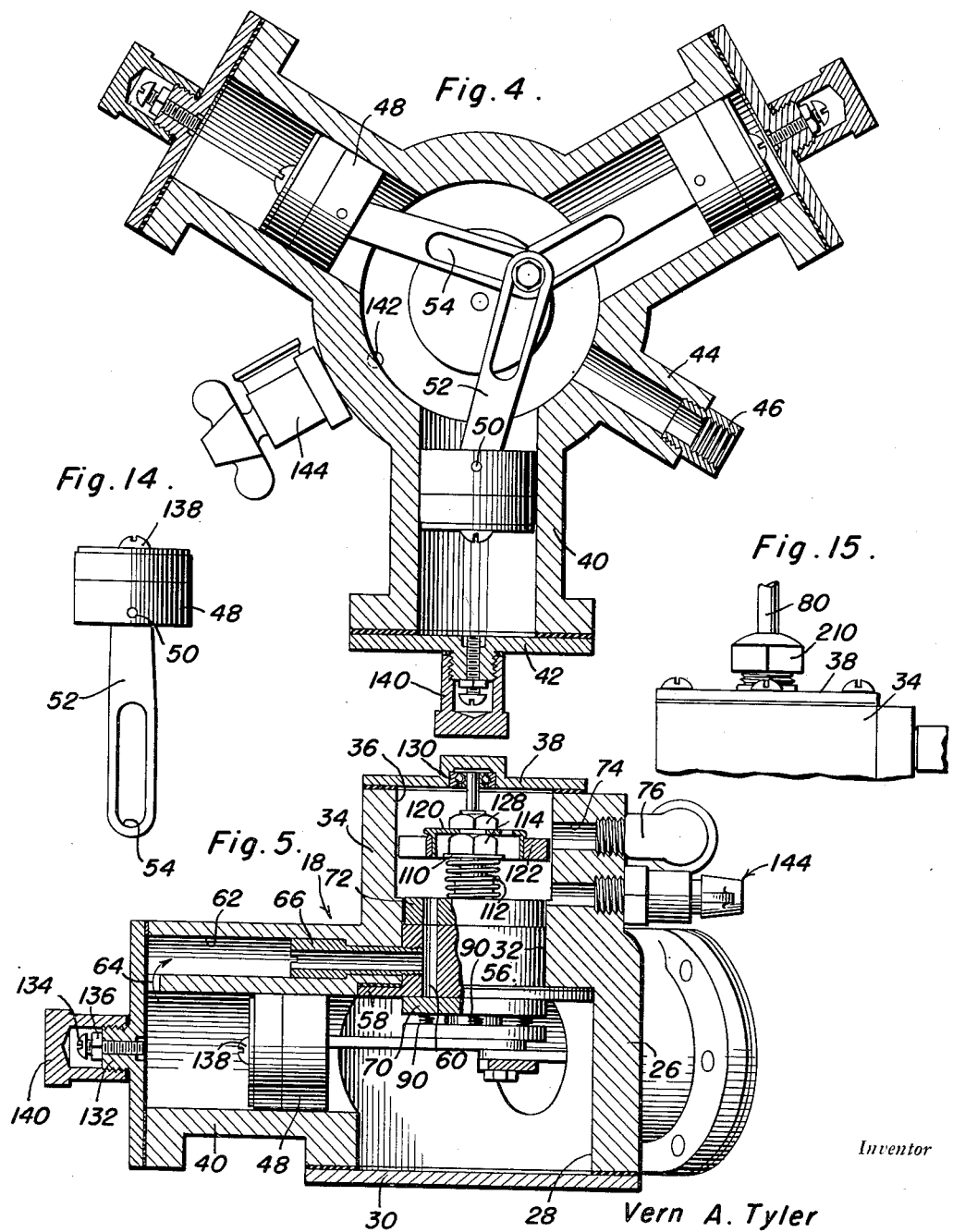

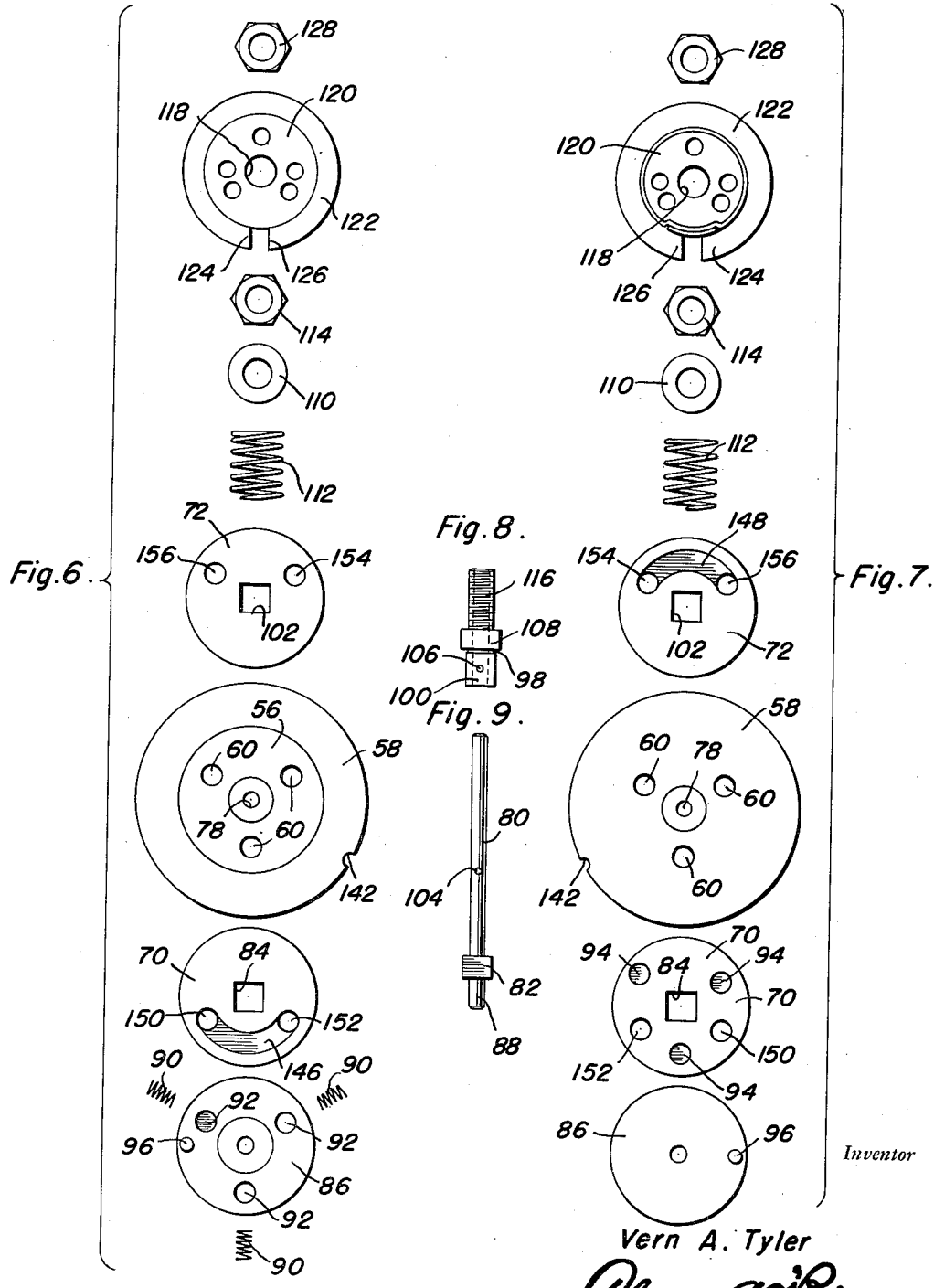

June 10, 1952  V. A. TYLER  2,600,032
LIQUID FUEL METER

Filed May 26, 1948  7 Sheets-Sheet 5

Vern A. Tyler
INVENTOR.

BY Clarence A. O'Brien
and Harvey B. Jacobson
Attorneys

June 10, 1952     V. A. TYLER     2,600,032
LIQUID FUEL METER
Filed May 26, 1948     7 Sheets-Sheet 6
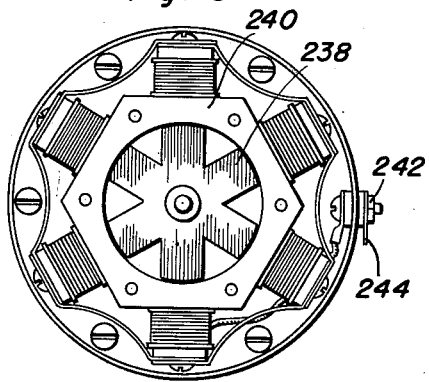
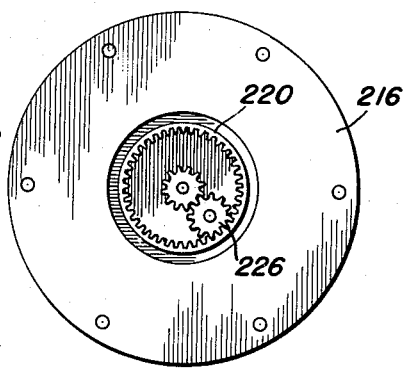
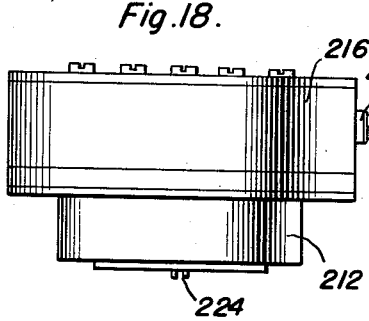
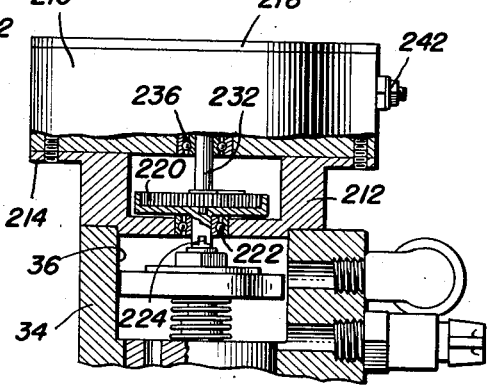
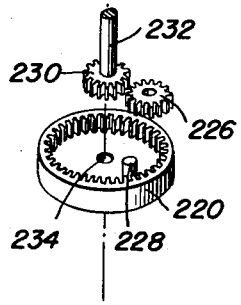
Inventor
Vern A. Tyler
By Clarence A. O'Brien
and Harvey B. Jacobson
Attorneys June 10, 1952 V. A. TYLER 2,600,032
LIQUID FUEL METER
Filed May 26, 1948 7 Sheets-Sheet 7

Inventor
Vern A. Tyler
By Clarence A. O'Brien
and Harvey B. Jacobson
Attorneys

Patented June 10, 1952

2,600,032

UNITED STATES PATENT OFFICE 2,600,032

LIQUID FUEL METER

Vern A. Tyler, Oklahoma City, Okla.

Application May 26, 1948, Serial No. 29,391

5 Claims. (Cl. 73—247)

This invention comprises novel and useful improvements in a liquid fuel meter and more specifically pertains to a meter for accurately measuring and registering fluid passing therethrough and operated by the pressure of said fluid.

The principal object of this invention resides in providing a fluid meter which shall have a positive metering action, wherein the operation of the meter may be readily and easily adjusted; wherein all moving parts may be enclosed within a leak-proof casing; and wherein there is provided an even and non-pulsating flow of fluid through the meter.

An important object of the invention is the provision of a novel means for varying the strokes of the individual metering pistons of the meter for compensating for wear and adjusting and calibrating the accuracy of the volume delivered by the meter with its indicating and registering mechanism.

A further feature of the invention comprises the provision of a meter wherein there are no moving parts extending through the casing thereof, with a view to minimizing possible leakage and loss of fluid pressure during the operation of the meter.

Another feature of the invention comprises a novel electro-magnetic means for operating the meter registering mechanism in synchronization with the operation of rotating parts within the body of the meter.

A still further feature of the invention consists in the provision of a novel and improved unitary valve assembly within the body of the meter for cyclically charging and discharging the various metering cylinders of the device.

An important further feature of the invention consists in the provision of a highly efficient electrical means for registering the rate of flow through the meter with accuracy and dependableness.

A final important feature of the invention to be specifically enumerated herein, resides in the provision of a novel construction of a self-contained meter which shall be entirely operated by the fluid pressure of the fluid medium whose flow and volume is being measured by the meter.

These, together with various ancillary objects of the invention which will later become apparent as the following description proceeds are attained by this device, preferred embodiments of which have been illustrated by way of example only in the accompanying drawings, wherein:

Figure 4 is a horizontal sectional view taken through the fluid body of the meter, certain parts being shown in elevation;

Figure 5 is a vertical transverse sectional view through the meter unit, parts being shown in elevation, showing the fluid chamber, a portion of the valve mechanism and the magnet chamber of the device;

Figure 6 is a group assembly view showing one side of the parts forming the valve assembly;

Figure 7 is a view similar to Figure 6 but showing the other side of the same valve parts;

Figure 8 is an elevational detailed view of the upper valve and magnet drive stem;

Figure 9 is an elevational view of the crank shaft;

Figure 14 is an elevational view of a metering piston and piston rod of the invention;

Figure 15 is a fragmentary detailed view in elevation showing a modification embodying a mechanical connection extending from the meter to the register;

Figure 16 is a top plan view, with the cover removed, of a generator which may be employed with the meter for operating a fluid flow registering or indicating device in accordance with the principles of the invention;

Figure 17 is a top plan view, showing the generator gear casing, parts being removed to show the gearing therein;

Figure 18 is a side elevational view of the generator casing;

Figure 19 is a fragmentary side elevational view, parts being broken away and shown in section, illustrating the valve, the permanent magnet, the generator casing, and the connecting gearing associated therewith;

Figure 20 is an assembly perspective view illustrating the gearing construction for driving the generator attachment of Figures 16-19;

Figure 1:
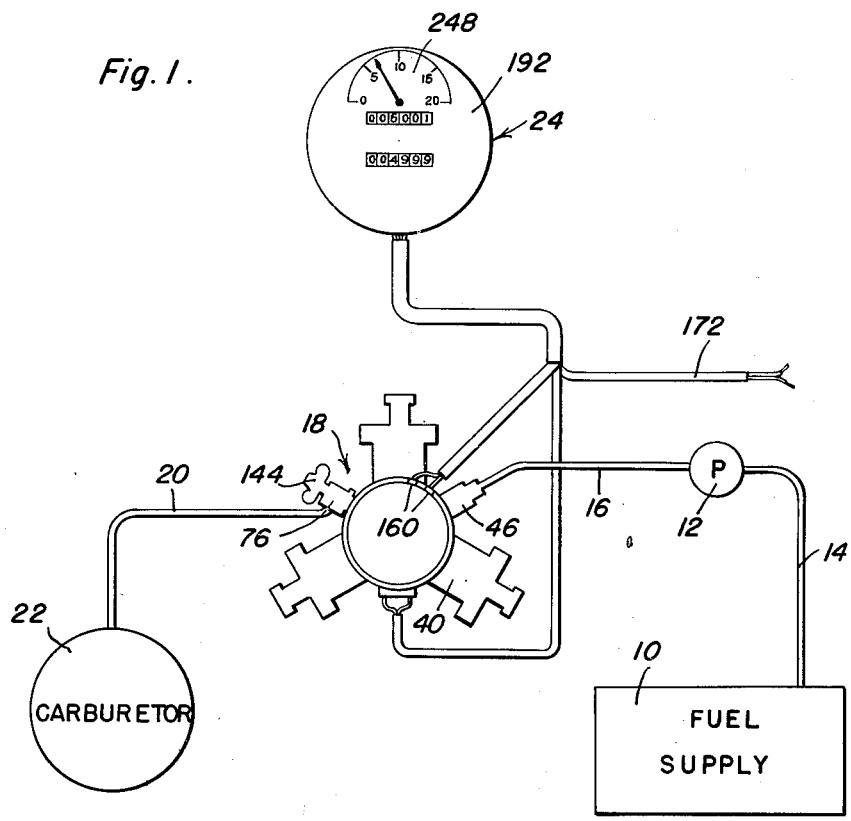
Figure 1 is a diagrammatic view indicating the association of the improved meter forming the subject of this invention with a fuel system of a carburetor for an internal combustion engine and with a fluid flow registering device.

Referring now more particularly to the accompanying drawings, wherein like numerals designate similar parts throughout the various views, attention is directed first to the diagrammatic view of Figure 1 for an understanding of the environment with which the meter may be employed, and which as shown includes a suitable source of fuel, such as a tank 10, together with a fuel supplying pump 12 of any suitable and known type, this pump drawing fuel through the supply conduit 14 from the tank.

The fuel pump delivers fuel under a constant pressure by means of the conduit 16 to the metering device indicated generally at 18 and forming the subject of this invention, from whence fuel is delivered, after being measured, by means of a conduit 20 to a carburetor 22 of any desired type. A measuring device indicated at 24 is connected to the meter unit in a manner to be subsequently set forth, for registering and indicating various data in accordance with the quantity of fuel passed through the meter.

Although in Figure 1 the meter has been shown applied to a liquid fuel supplying system for a carburetor of an internal combustion engine or other suitable consumer of fuel, it is to be understood that the principles of the invention are not limited thereto, since the device is of general application and may be employed wherever a fluid, whether gaseous or liquid, is delivered under pressure and is to be metered and registered.

Attention is now directed chiefly to Figures 2–5 for an understanding of the construction of the meter. A generally cylindrical hollow casing or body 26 is provided having an internal bore or chamber 28 opening through the lower end thereof, and provided with a cover plate 30 detachably secured thereto. At its upper end, the body has a bore 32 of reduced diameter communicating with the chamber 28, this bore extending into an integral axial extension of the body 26, this extension being indicated at 34 and having an internal bore 36 forming a permanent magnet and pressure fluid discharge chamber as indicated at 36, this chamber opening to the upper surface of the meter body 18 and being provided with a detachable cover plate 38.

A plurality of cylinders 40 extend from the body 26 and are in open communication with the chamber 28 thereof, these cylinders being indicated as radially arranged, with their outer extremities open and provided with removable cylinder heads 42 attached in any suitable manner. Also communicating with the chamber 28 of the body 26, is a tubular boss 44, having a packing gland 46 for connecting the fuel inlet conduit 16 to the interior of the chamber 28 of the meter in free and open communication therewith.

A plurality of pistons 48 of any suitable design, are slidably received in the cylinders 40, and are connected as by wrist pins 50 with connecting rods 52, having elongated slots 54 in the lower ends thereof, for attachment to a crank pin to be later described.

Removably received in the bore 32 connecting the delivery chamber 36 with the crank chamber or casing 28, is a unitary valve assembly, see Figures 6 and 7, including a cylindrical valve body 56 snugly received in the bore 32, and provided at its lower end with an annular flange 58 received in the shoulder connecting the bore 32 with the chamber 28. The valve body 56 is provided with a plurality of parallel valve bores 60 extending through the valve body which bores are equidistantly spaced from the longitudinal axis of the valve body and are evenly spaced from each other, there being one such bore provided for each cylinder 40 of the meter. Although in the embodiment shown there are three cylinders and three bores illustrated, it will be readily understood that the principles of the invention are applicable to a metering arrangement having any desired number of cylinder bores and consequently the same number of valve bores 60.

Figure 2:
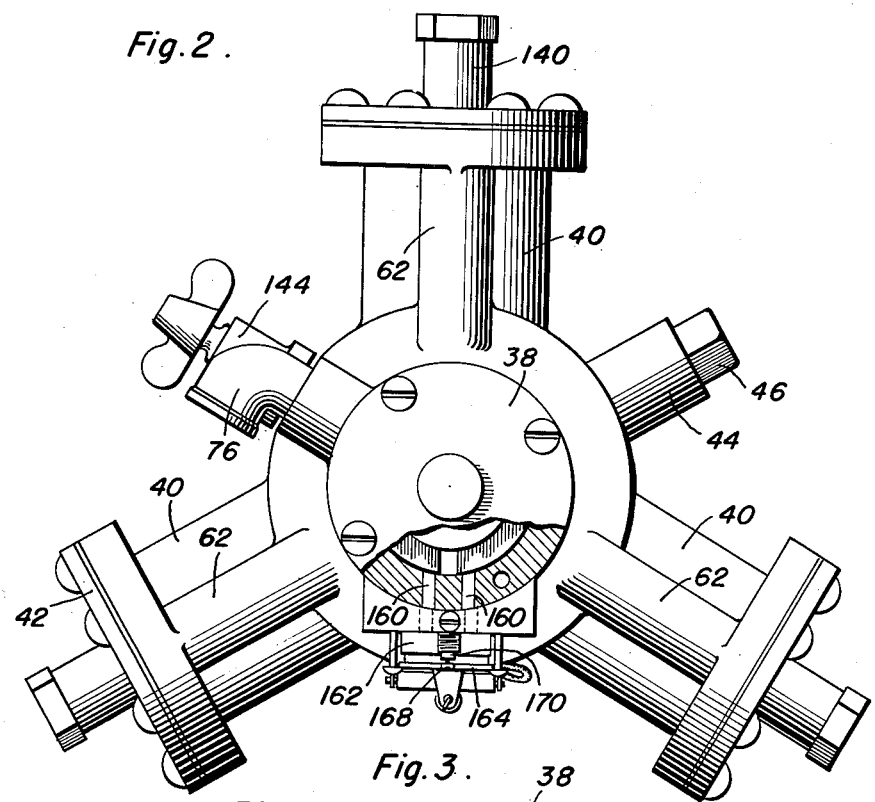
Figure 2 is a top plan view, parts being broken away and shown in section, of the improved meter.

Integrally formed in the body portion 26 adjacent to and in parallelism with the cylinders 40, are fluid intake and delivery passages 62, see Figures 2 and 5, which at their outer extremities communicate with the interior of the cylinders 40 outwardly of the pistons therein, as by means of lateral bores or passages 64. The above mentioned cylinder heads 42 serve to simultaneously cover the bore of a cylinder 40 and of its associated passage 62 as shown clearly in Figure 5.

A tubular bushing 66 is seated by a shouldered engagement in the inner end of the bore 62 and has a screw threaded lower extremity engaged in the valve body 56 and in open communication with one of the corresponding bores 60, these bushings thus maintaining or assisting in retaining the valve body 56 in the bore 32. By this means, the pressure or delivery side of each of the cylinders is continuously in communication with its passage 62 and its valve body bore 60. By means of a rotary inlet valve 70 and a similar rotary outlet valve 72, whose constructions are to be later described, each valve body bore 60 and the associated metering chamber of the appropriate cylinder which is continuously in free communication therewith, are alternately placed in communication with the interior of the chamber 28 by means of the valve 70 or with the interior of the fluid pressure discharge chamber 36 by means of the valve 72, from which latter chamber the metered fuel is delivered by a discharge bore 74 and fitting 76 to the fuel discharge line 20 from whence it is delivered by a discharge bore 74 and fitting 76 to a conduit 20 by which it is conducted to the point of use such as the carburetor 22.

As so far described, it will be thus seen that the fuel delivered under a constant pressure by the pump 12 and conduit 16 is supplied to the interior of the crank case or chamber 28 by means of the connection 46 and tubular boss 44, to thereby constantly supply and maintain a pressure continuously against the lower surface of the pistons which are exposed to the interior of the casing, and from whence it is selectively conducted under control of the valve 70, intermittently by means of the bore 60, tubular member 66, passage 62, to the delivery or metering chamber of the cylinder 40, and thence back by passage 62, bushing 66 and bore 60 and by way of the discharge valve 72 to the delivery chamber 36, from whence it is fed by bore 74 and fitting 76 to the fuel discharge line 20.

Attention is now directed more particularly to Figures 5–9 for an understanding of the construction of the valve assembly and the crank pin carried thereby. An axial bore 78 extends through the valve body 56 and constitutes a bearing for the crank shaft 80. Adjacent its lower end, the crank shaft is provided with a squared portion or shoulder 82 upon which is non-rotatively received a similar shaped axial opening 84 by means of which the lower valve 70 is fixed to the crank shaft and in rotary sliding engagement with the lower surface of the flange 58 of the valve body. A crank disk 86 is suitably secured upon the extremity 88 of the crank shaft 80, being rigidly fixed to the crank shaft and being slightly spaced from the lower surface of the valve plate 70, with a plurality of springs 90 seated in aligned seats 92 and 94, see Figure 7, of the crank disk and valve plate respectively. By this means, a slight but continuous pressure is applied beneath the valve 70 to resiliently urge the same upwardly into sealing and seating engagement with the extremities of the ports 60. The purpose of this construction will be later set forth in detail.

Upon its outer or lower side, the crank disk 86 has an eccentric crank pin 96 which may, if desired, be in the form of a bolt, detachably secured thereto. This bolt extends through the slots 54 in each of the connecting rods 52, for connecting the pistons to the crank pin for a purpose to be later set forth. The other end of the crank shaft 80 extends upwardly through the bore 78 of the valve body, and detachably receives a combined magnet and valve sleeve 98, having a squared extremity 100 at its lower end for non-rotatably seating a correspondingly shaped axial bore 102 of the upper valve disk 72. Aligned apertures 104 and 106 in the crank shaft 80 and magnet sleeve 98 respectively are engageable by a fastening pin for locking these parts into their assembled position.

A collar 108 integrally formed upon the sleeve 98, is intended to seat a washer 110 by means of which a spring 112 is compressed beneath the washer and against the upper surface of the upper valve 72, this spring being tensioned and retained by a fastening nut 114. Of course, a plurality of springs could be substituted for the single spring 112 in the same movement or springs 90. This fastening nut engages the externally threaded upper end 116 of the sleeve 98. By means of an axial bore 118, an annular ring 120 carrying a peripheral annular permanent magnet 122 having opposed pole spaces 124 and 126, is detachably received upon the threaded portion 116, and retained thereon as by locking nut 128. The circumference of the magnet 122 extends into very close juxtaposition to the inner cylindrical surface of the chamber 36 for a purpose to be later set forth. The outer extremity or upper extremity of the crank shaft 80 is received and journaled in an anti-friction ball bearing assembly 130 formed in the cover 38.

As will be noted in Figure 5, the spring 112 serves the dual function of resiliently urging the upper valve 72 to sealing and seating engagement upon the valve body 56, and further biases the crank shaft 80 into its uppermost position. At the same time, the spring assembly 90 serves to at all times yieldingly maintain the valve 70 into sealing and seating engagement with the lower valve surface of the valve body 56.

As shown best in Figure 5, each of the cylinder heads 42 is provided with an axially outwardly extending externally threaded boss 132. Extending through the tubular boss 132 and into the interior of the cylinder 40, is an adjusting screw 134 provided with a locking nut 136. This screw may be adjusted inwardly until it engages a screw 138 carried by the upper surface of the piston 48, to constitute an abutment or stop and limit further upward travel of said piston. Obviously, by adjusting the screw 134 inwardly, the stroke of piston 48 may be readily regulated in a manner to be subsequently set forth. A covering or closure cap 140 is provided for housing the adjusting screw 134, being screw threadingly engaged upon the external threads of the boss 132.

As shown by Figures 4, 6 and 7, a bore or passage 142 is drilled at any convenient place, such as in the adjacent portions of the valve body 56 and wall of the bore 32, this bore connecting the chambers 28 and 36 and acting as a fluid bypassage around the metering valve, to establish a bypass line between the intake and discharge conduits under the control of any suitable construction of bypass valve indicated generally at 144. By means of this bypass and bypass valve, whose presence is conventional for enabling a fluid to bypass its meter, when desired, a constant supply of fluid may be delivered from the pump 12 to the delivery line 20, if for any reason the meter should become defective. However, this bypass passage and valve form no part of the present invention, or of its operation.

Figure 10:
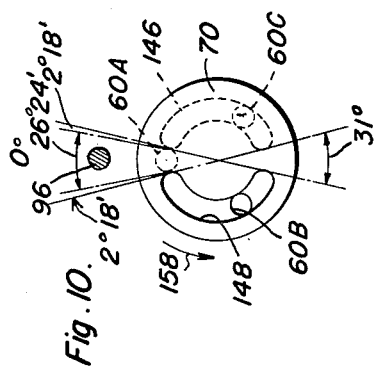
Figure 10 is a diagrammatic view showing in plan the arrangement of the ports of both of the valve units relative to the valve body.

Attention is now directed more specifically to Figures 6, 7, 10–13 for an understanding of the construction and operation of the valve plates 70 and 72, which are of identical construction, one of these being indicated as at 72 in Figure 10. The surfaces of the valve plates adjacent the valve body upper and lower surfaces, are provided with arcuate inlet and exhaust ports in the form of grooves 146 in the intake valve, and 148 in the exhaust or discharge valve, the extremities of these grooves terminating in ports or bores 150 and 152 for the intake valve 70 and 154 and 156 for the exhaust valve 72. The grooves 146 and 148 are positioned exactly one hundred eighty degrees apart upon the crank shaft 80, to properly control the inward and outward strokes of the metering pistons. As will be readily seen, by reference to Figure 10, each of the grooves registers in turn at 120° intervals with one of the bores 60 in a three cylinder meter. The same construction of valves could obviously be employed with appropriate angular registration with the valve body bores for any given number of cylinders desired.

It is obvious that any suitable type of metering valve may be substituted for the particular valve illustrated in order to properly time the communication of the metering chamber of the cylinders 40 with the fluid pressure supply on the interior of the casing 28, and with the pressure discharge chamber 36 at the outlet side of the meter. However, in the illustrated form of three cylinder meter, a very satisfactory and efficient porting arrangement shown in Figures 10–13 can be employed. In this arrangement, each of the arcuate grooves or channels 146 and 148 extend through one hundred forty-nine degrees of crank pin travel, while the diameters of the bores 60 extend through twenty-six degrees and twenty-four minutes of crank pin travel. As shown in Figure 10, when the crank pin 96 is in its upper dead center position relative to any given cylinder, the port 60 will be exactly centered between the two arcuate valve channels 146 and 148, with a clearance or spacing of two degrees and eighteen minutes therebetween. In the diagrammatic views of Figures 10–13, the arrow 158 indicates the direction of rotation of the crank shaft while the numerals 60a, 60b and 60c designate respective valve body bores likewise taken in the direction of crank shaft rotation.

It will therefore be seen that the top dead center of the cylinder which is in communication with the bore 60a, the valve discharge port 148 has broken communication with the bore 60a and is positioned two degrees and eighteen minutes therefrom; while the intake port 146 is still two degrees and eighteen minutes before its registration with said bore. At the same time, the bore 60b is in registration with the discharge port 148 while bore 60c is in registration with inlet port 146.

This space or lead of two degrees and eighteen minutes between the ports 148 and 146 and the bores 60 at the dead center positions, provide a satisfactory and ample sealing engagement preventing leakage of the fluid under pressure directly past the bore 60 from the inlet to the outlet ports of the valve assembly. When now the crank pin has rotated one hundred twenty degrees to the position indicated at 96 in Figure 11, it will be seen that the discharge valve 148 has now broken communication with the bore 60b, has established communication with the bore 60c, while the inlet passage 146 is in communication with bore 60a, has broken communication with the bore 60c and as in Figure 2, there is a two degree and eighteen minute lag and lead of the port 60b with respect to the valve portions 148 and 146.

At this time, it will be seen that the cylinder associated with bore 60a has nearly completed its charging stroke; the cylinder associated with bore 60b has completed its exhaust stroke and is now ready to charge, while the cylinder associated with bore 60c having completed its intake stroke is now engaged on its discharge stroke.

Figure 12:
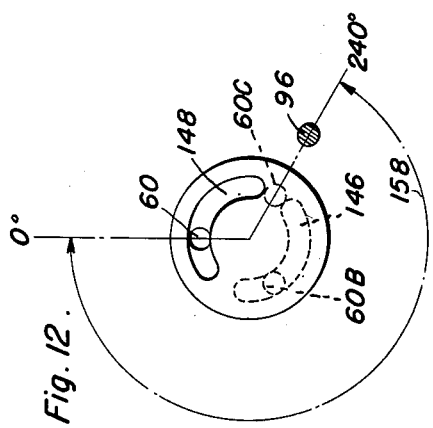
Figure 21:
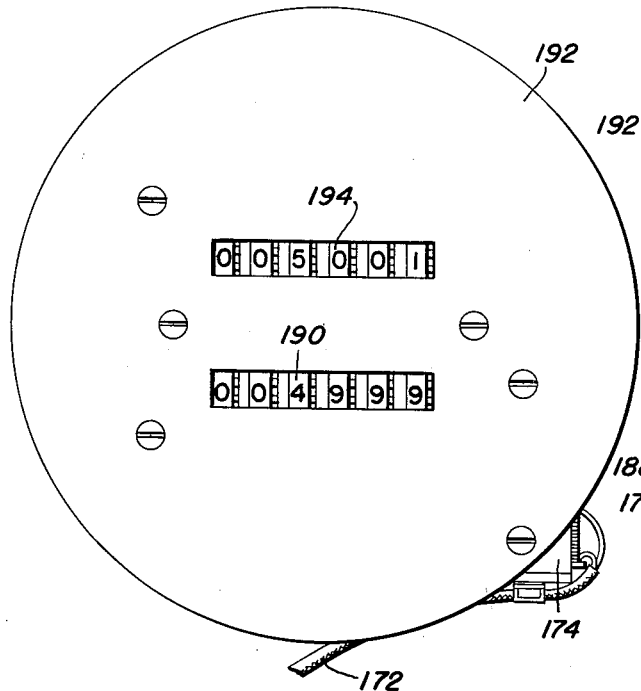
Figure 21 is a top plan view of a register which may be employed in conjunction with the improved meter.
Figure 22:
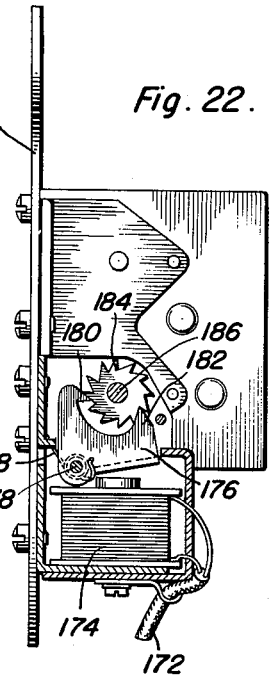
Figure 22 is a side elevational view of the register, showing the operating mechanism thereof.
Figure 23:
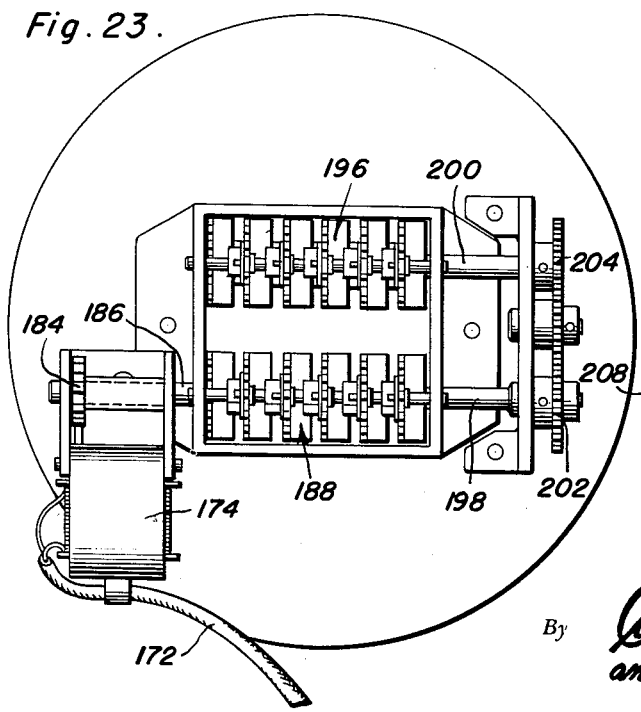
Figure 23 is a bottom plan view of the register showing the arrangement and construction of the operating means thereof.
Figure 24:
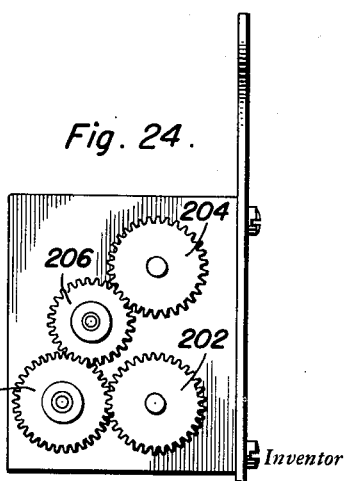
Figure 24 is an end elevation of Figure 23 showing the gearing assembly thereof; and, Figure 25 is a diagrammatic electrical wiring diagram of the meter having electric indicating mechanism of Figures 16–24 associated therewith.

After two hundred forty degrees of crank shaft rotation, as indicated in Figure 12, the cylinder associated with bore 60c is now on its top dead center position, and is now ready to start its charging stroke; while the cylinder associated with bore 60a is engaged on its discharge stroke and the cylinder associated with bore 60b is near the end of its discharging stroke.

Figure 13:
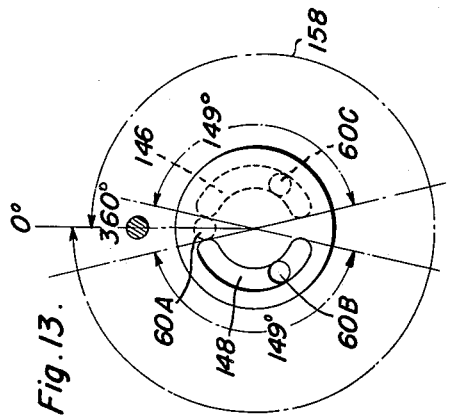

Upon the completion of a final one hundred twenty degree movement, as shown in Figure 13, the parts are now restored to the position indicated in Figure 10. It will thus be seen that throughout the entire three hundred sixty degrees of revolution, at least one cylinder is charging while at least one cylinder is on its delivery stroke. Accordingly, there is a constant smooth and uniform flow of fluid through the meter, improving the characteristics of fluid flow of the device with which the meter is associated and contributing to an accurate and smooth operation of the meter itself.

The operation of the meter unit will now be readily understood from the foregoing. A constant fluid pressure is continuously supplied and maintained on the interior of the chamber 28 in contact with the undersurfaces of each of the pistons 48. However, in that piston or pistons which are on their charging stroke, a free passageway is established by means of passages 64, 62, sleeves 66, bores 60, intake ports 146 and bores 150 and 152 with the interior of the casing 28, whereby the fluid pressure on both sides of piston 48 are balanced and equaled. Consequently, that piston or those pistons on their charging or intake stroke are free floating with no difference in pressure from one side to the other, whereby they may be freely moved in their cylinders by engagement of the crank pin 96 at the bottom or inner end of the crank pin slots 54. However, the cylinder or cylinders which are on the delivery stroke, have their metering chambers closed off from the pressure chamber 28, by means of the solid portion of the valve 70, while they are open to the discharge chamber 36 through the valve 72 by means of the channels 148 and ports 154 and 156. Consequently, there is a pressure difference between the crank case side of the piston, and the metering chamber side thereof, the latter having a lower pressure. Accordingly, the unbalanced pressure on the two sides of the piston or pistons on their delivery stroke, causes these pistons to move radially outwardly from the crank shaft, positively displacing a corresponding volume of fluid from the metering chamber and delivering said fluid into the discharge chamber 36 and discharge ports 74. This outward movement of the pistons and connecting rods causes rotation of the crank shaft 80 by means of engagement of the inward ends of the slots 54 of the connecting rods with the crank pin 96, the crank pin in turn draws inward those pistons on their charging stroke, this inward movement encountering no resistance as set forth above.

Each time the crank shaft makes one revolution, there have been three metering actions, one by each of the pistons, and a permanent magnet assembly rigidly carried by the upper end of the crank shaft has thus made one rotation within the chamber 36. By a means to be subsequently set forth, each rotation of the permanent magnet corresponding to a calibrated and proportioned volume of fluid passed through the meter, is registered by electro-magnetic means to be later set forth upon the registering device 24, and may be indicated either in number of revolutions, or in addition calibrated to the volumes delivered by such revolutions.

Since as clearly shown in Figure 5, there are no moving parts extending from the interior to the exterior portion of the meter, there is no leakage or loss of fluid pressure from the interior to the exterior. Consequently, the action of the meter is very accurate and when once adjusted little calibration or change is necessary. However, in order to accurately calibrate the volume delivered by each piston during each revolution, and in order to suitably adjust or distribute the total volume delivered between the total number of pistons, an individual adjustment is provided for varying the stroke and consequently the volume of fluid passed through each metering piston. For this purpose, the screw 134 is adjusted inwardly, whereby it will contact the abutment screw 138 on the head of the piston, before the latter has completed its greatest possible outward movement in its cylinder. Upon the engagement of the screw 134 with the screw 138, further outward travel of the piston is stopped, and accordingly, delivery of fluid from that cylinder ceases. However, the crank shaft either because of its momentum, or because of propulsion from another piston on its delivery stroke, continues to rotate, and this rotation is permitted by the crank pin 96 riding freely in the outer extremity of the slot 54. This continued rotation of the crank pin is not affected by stoppage of its corresponding piston, and may continue whereby the other pistons are not bound or locked by stoppage of one piston. As the crank shaft passes over its dead center position with respect to the piston whose travel is stopped, it starts upon its inward stroke, and as the crank pin reaches the lower end of the slot 54 of the stopped piston, the latter is retracted on its intake stroke. Accordingly, the effective stroke of any piston may be readily adjusted without impairing the operation of the other rotating and reciprocating parts of the meter and thereby the metered quantity of fluid may be proportionately adjusted among the various metering cylinders.

In addition to this adjusting or dividing of the metering action between the pistons, the elongated slots 54 in the connecting rods further serve as a safety device in meters having five or more cylinders, whereby if for any reason one of the metering cylinders becomes obstructed, either by seizure of a piston in that cylinder, by clogging of one of the passages connected therewith or for other reasons, the meter will continue to function, whereby the device drawing fuel therethrough may continue to operate, although the accuracy of the metering operation may be impaired. An important feature of the stroke adjustment of the individual piston is its capability for compensating for slight irregularities or deficiencies of valve timing.

Figure 3:
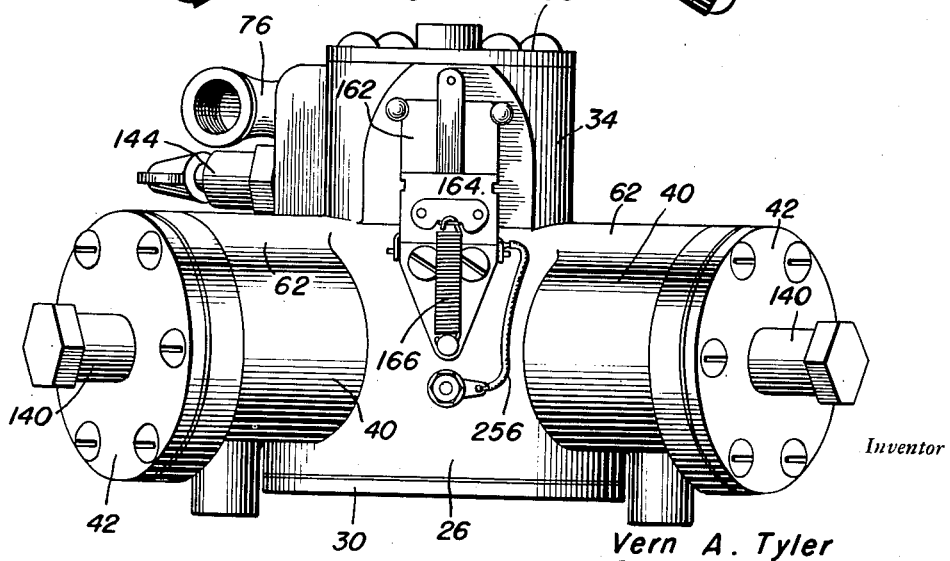
Figure 3 is a side elevational view of the meter shown in Figure 2.
Figure 11:
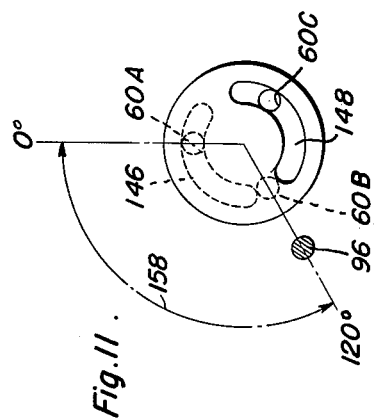
Figures 11, 12 and 13 are diagrammatic views illustrating the relative position of the valve ports, crank pin and the valve body ports through 360 degrees of operation of the meter.

Attention is now directed to Figures 1, 2 and 3 for an understanding of the electro-magnetic connecting means between the meter and the register. Extending through the walls of the body 34 into the delivery chamber 36, are a pair of magnetic pole pieces 160 which as shown in Figure 2, are positioned to magnetically register with the permanent magnet poles 124 and 126 once in each revolution of the magnet and crank shaft, to thereby induce a flow of magnetic flux in the pole pieces 160 and in the associated armature of the relay indicated generally at 162 and associated therewith. The flow of the magnetic flux through the relay 162 is sufficient to operate the armature 164 against the resistance of a return spring 166, to thereby establish a connection through the fixed and adjustable contacts 168 and 170 respectively. The closing of these latter contacts thereby completes a circuit from any external source of power by means of the electric cable 172, through the register 24 to cause actuation of the mechanism therein. Obviously, one such energization of the relay occurs for each revolution of the meter and consequently, one actuation of the register for each revolution.

Obviously, any suitable register may be employed for response to, registering and indicating the number of actuations of the relay, and thereby the number of revolutions and correspondingly the quantity of fluid passed through the meter. One such form of register which has been found to be satisfactory, closely resembles the construction of a conventional type of speedometer, and is indicated in Figures 21–24. An electric cable 172 is connected to a solenoid 174, which operates an armature 176 pivoted as at 178, which armature comprises an escapement wheel having pawls 180 and 182 respectively engageable with an escapement ratchet 184 secured to the operating shaft 186 of the register. A spring 188 serves to return the armature to its inoperative position. Thus, each time the relay 162 is actuated, an impulse is set up through the power circuit 172 to operate the solenoid 174, whereby one actuation of the escapement lever 176 is effected, the pawls 180 and 182 of which permit the escape of one tooth of the escapement pinion 184, and a corresponding fractional rotation of the shaft 186. The shaft 186 operates in the conventional type of counting register, as indicated at 188, bearing indicia 190 which are exhibited upon the face plate 192 of the registering device. If desired, a second set of indicia 194 may be similarly actuated by a mechanism similar to that at 188 and indicated at 196, to give a reading whereby the revolutions of the meter are subtracted from the register setting indicating the original quantity of liquid from which the meter draws its supply. Thus, the register may be utilized both to indicate the quantity passing through the meter as well as to indicate the quantity remaining in the source of supply. This feature may be extremely useful in aviation uses, whereby the pilot can readily ascertain the quantity of fuel consumed by the motors as well as the quantity remaining in the tanks. Other analogous uses will of course be readily understood. To carry out these functions, the registering devices 188 and 196 are respectively connected to shafts 198 and 200, having gears 202 and 204 upon their outer extremities. Idler gears 206 and 208 connect the gears 202 and 204 for reverse operation.

It should be understood that the particular register illustrated is for purposes of example only, since any desired type of register may be employed. However, the advantages of the meter are best obtained by employing an electro-magnetic and electrical type of drive for controlling the register, to thereby avoid a possible source of leakage occasioned by rotating the shaft extending through the exterior casing of the meter.

In some instances, however, it may be found desirable to employ a mechanical connection, from the meter to the register, and for this purpose the construction shown in Figure 15 may be employed. Here, the end of the crank shaft 80 is extended through the upper cover plate 38 of the body portion 34, and a packing gland 210 is employed to establish a fluid-tight seal at this point. The shaft 80 is connected by any suitable mechanical connection with the register for energizing the same. The principle of operation and the calibrations of the rotations of the meter crank shaft to the indications of quantities of fluid on the register, are identical with that set forth hereinbefore.

In some instances, in addition to the registration of the number of units of fluid passing through the meter, it may be found desirable to indicate further the rate of flow of fluid through the meter as for example determining the rate of fuel consumption of engines. For this purpose, the attachment indicated in Figures 16–20 is employed. The cover plate 38 above mentioned is removed from the fluid discharge casing 36 of the body portion 34, and a generator gearing casing 212 having an annular flange 214 to which is detachably secured a generator 216 having a cover plate 218 is secured in place thereon.

An internal ring gear 220 is journalled in bearings 222 in the bottom wall of the gear casing 212, and provided with a detachable tongue and groove connection as at 224, for the upper extremity of the crank shaft. An idler gear 226 rotatable upon a stub axle 228 carried by the internal gear 220, is in constant mesh with said internal gear, and with a driven pinion 230 carried by the generator drive shaft 232 journalled in an axle bearing 234 in the internal gear.

Figure 25:
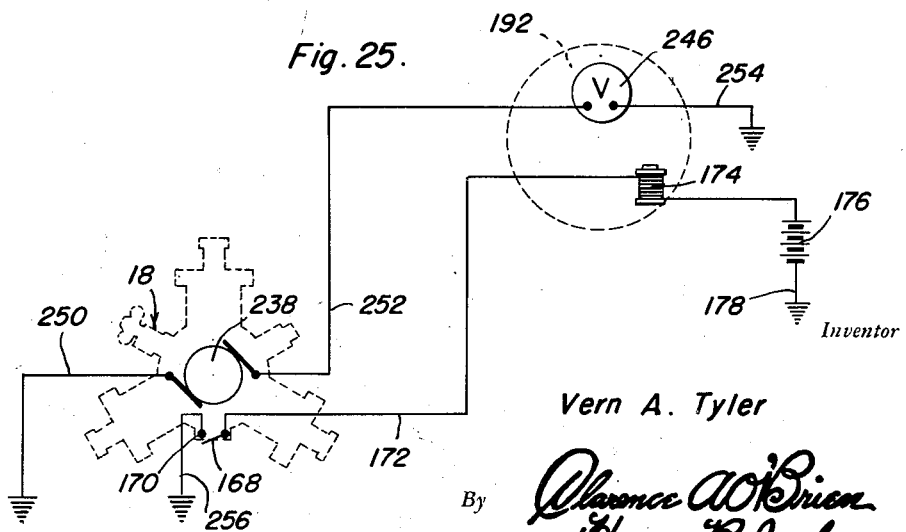

The generator shaft 232 extends through antifriction bearings 236 carried by the bottom wall of the generator casing 216 and has secured thereby the generator armature indicated generally at 238 in Figure 16, which may be of any suitable type, that indicated consisting of a permanent magnet having a plurality of poles and revolving within a field housing 240 whose coils are connected by a terminal 242 to an electric conductor 244. Obviously, the permanent magnet or armature 238 revolves at a speed which is proportional to the speed of revolution of the meter crank shaft, whereby the strength of the current induced in the field coils and in the conductor 242 is proportional to the speed of rotation and consequently the rate of fluid flow through the meter. The conductor 244 may be attached to a conventional volt meter indicated at 246 in Figure 25, which may read directly in units of fluid per unit of time, by means of a calibrated register indicated at 248 in Figure 1.

In Figure 5 is indicated a wiring diagram of the electric relay actuating means for the register and for the electric generator for operating the rate of flow indicating volt meter. Here is a generator armature indicated generally at 238 and is shown diagrammatically connected with one side of the relay to the ground by the conduit 250 and the other side of the relay by a conduit 252 to the above mentioned volt meter 246 and from thence to the ground by a conduit 254. The electrically operated relay has its fixed contact 170 connected to the ground as by a conductor 256, while its movable contact 168 is connected by a conductor 172 with the solenoid coils 174 and to a battery 176 for other source of electrical current, and thence by conduit 178 to ground.

From the foregoing, it is believed that the manner of constructing and operating the meter will be readily understood and further explanation thereof is believed to be unnecessary. Since numerous modifications falling within the scope of the invention will be readily understood by those skilled in the art after a consideration of the accompanying specification and attached drawings, it is not intended to limit the invention to the exact construction shown and described, but all suitable modifications and equivalents may be resorted to falling within the scope of the appended claims.

Having described the invention what is claimed as new is:

1. A meter comprising a casing, cylinders communicating with said casing, pistons slidable in said cylinders, means for supplying a continuous fluid pressure in said casing and against the underside of said pistons, a fluid delivery line, passage and valve means for cyclically establishing communication between the top side of each piston and with said means and delivery line respectively for charging each cylinder and delivering measured charges therefrom, a crank shaft in said casing, a connecting rod connecting each piston to said crank shaft, each connecting rod having an elongated slot loosely receiving said crankshaft, adjustable stop means carried by each cylinder and operatively engageable by the piston within the associated cylinder for varying the stroke of the piston therein to regulate the quantity of fluid delivered by said piston.

2. In a fluid meter, a casing having a plurality of alined bores comprising a crank chamber, a valve chamber and a fluid discharge chamber, said casing having cylinders therein opening into the crank chamber, pistons slidable in said cylinders and having piston rods extending into said crank chamber, means communicating with said crank chamber for supplying fluid under pressure, a unitary valve assembly including a valve body demountably secured in said valve chamber, a crankshaft journaled in said valve body and having a crank pin connected to said piston rods, said valve body having parallel bores extending therethrough and terminating in the crank and discharge chambers, each of said parallel bores having continuous communication with one of said cylinders on the opposite side of the piston from the crank case chamber, inlet and discharge valves controlling the ends of said parallel bores, said valves being operated by and in timed relation to said crankshaft.

3. The combination of claim 2 wherein said valves consist of annular disks bearing against the adjacent ends of said valve body and resilient means urging said disks adjacent said valve body.

4. The combination of claim 2 wherein the inlet valve resilient means is interposed between said inlet valve and a crankthrow on said crankshaft.

5. The combination of claim 2 wherein one of said alined bores is an opening to the outside of said casing, a cover for said opening, said valve assembly being removable as a unit from said crank case through said opening.

VERN A. TYLER.

REFERENCES CITED

The following references are of record in the file of this patent:

UNITED STATES PATENTS

| Number | Name | Date |
| --- | --- | --- |
| 144,747 | Desper | Nov. 18, 1873 |
| 1,305,803 | Irwin | June 3, 1919 |
| 1,696,132 | Wermeille | Dec. 18, 1928 |
| 2,208,950 | Risser | July 23, 1940 |
| 2,314,752 | Zwack | Mar. 23, 1943 |
| 2,326,169 | Piquerez | Aug. 10, 1943 |
| 2,413,034 | De Lancey | Dec. 24, 1946 |
| 2,507,798 | Maxwell | May 16, 1950 |
| 2,529,481 | Brewer | Nov. 14, 1950 |

FOREIGN PATENTS

| Number | Country | Date |
| --- | --- | --- |
| 31,602 | France | Dec. 29, 1926 |
| 323,198 | Great Britain | Dec. 23, 1929 |